United States Patent

Fine

[11] Patent Number: 5,842,164
[45] Date of Patent: Nov. 24, 1998

[54] DYNAMIC PATTERN RECOGNITION SYSTEM

[75] Inventor: Amos Fine, Hadera, Israel

[73] Assignee: BATL Software Systems Ltd., Hadera, Israel

[21] Appl. No.: 731,870

[22] Filed: Oct. 21, 1996

[51] Int. Cl.$^6$ ............................. G06K 9/00; G06F 15/38
[52] U.S. Cl. .......................................... 704/244; 382/159
[58] Field of Search .................................. 382/156, 157, 382/159, 218; 704/243, 244

[56] References Cited

U.S. PATENT DOCUMENTS

| | | | |
|---|---|---|---|
| 5,133,021 | 7/1992 | Carpenter et al. | 382/156 |
| 5,142,590 | 8/1992 | Carpenter et al. | 382/157 |
| 5,287,275 | 2/1994 | Kimura | 707/5 |
| 5,459,798 | 10/1995 | Bailey et al. | 382/218 |
| 5,748,769 | 5/1998 | Nishimura et al. | 382/159 |

*Primary Examiner*—Krisna Lim
*Attorney, Agent, or Firm*—Darby & Darby

[57] ABSTRACT

A dynamic pattern matching system (DPRS) for a communication system is disclosed. The DPRS enables the command processor within the communication system to be flexible, permitting commands and their associated responses to be added, deleted and changed on the fly while the communication system is operative. A user designs a command set and constructs a trap definition file. This trap definition file is read by the DPRS during initialization and a trap chain is constructed. The trap chain is a linked list of all the traps constituting the command set. Traps, however, can be added and deleted on the fly via commands from the remote host or entered by a user via the keyboard or menus. The DPRS can be used as a tool to dynamically alter the behavior of an existing host application communication system. The DPRS can function as a stand alone flexible command processor or can work in parallel or serial fashion with a conventional command processor.

19 Claims, 6 Drawing Sheets

IMPLENTATION EXAMPLE—TRAP DEFINITION FILE CONTENTS :

```
"LOGIN:"     02  08  "AUTOLOG.CMD"
"LOGGED OUT" 02  05
""           04  00  ""
<EOF>
```

FIG. 7B

DYNAMIC PATTERN RECOGNITION SYSTEM

FIELD OF THE INVENTION

The present invention relates generally to pattern recognition systems and more particularly relates to a system for dynamically recognizing patterns in connection with a communications system.

BACKGROUND OF THE INVENTION

Communication programs have been and are currently in wide spread use. They are used to permit two devices to transmit and receive data from one to the other. These programs utilize communication lines to transmit and receive data between each device on either end of the link. An example of such a communications program is the program called 'TERMINAL' that is bundled as an accessory with each copy of the Windows operating system manufactured by Microsoft Corp., Redmond, Wash.

Typically, a communications program receives input from mainly two different sources. The first source is from the device on the other end of the communication line (e.g., the remote host). The second major source of data is from the user via the keyboard, pointing device (e.g., mouse) or other input device. The major output targets of a typical communications program are the screen or display terminal, communication line(s), printer and operating system calls.

The data flow in conventional communications programs typically takes the following two forms. The first is data that is received from the remote host via the communication line which is processed by a command processor within the communication program. Most of this data is sent to the screen or display device. The second form is data that is received from the keyboard. This data is processed by the keyboard processor within the communication programs and most of this data is sent to the remote host via the communication line.

Figure 1:
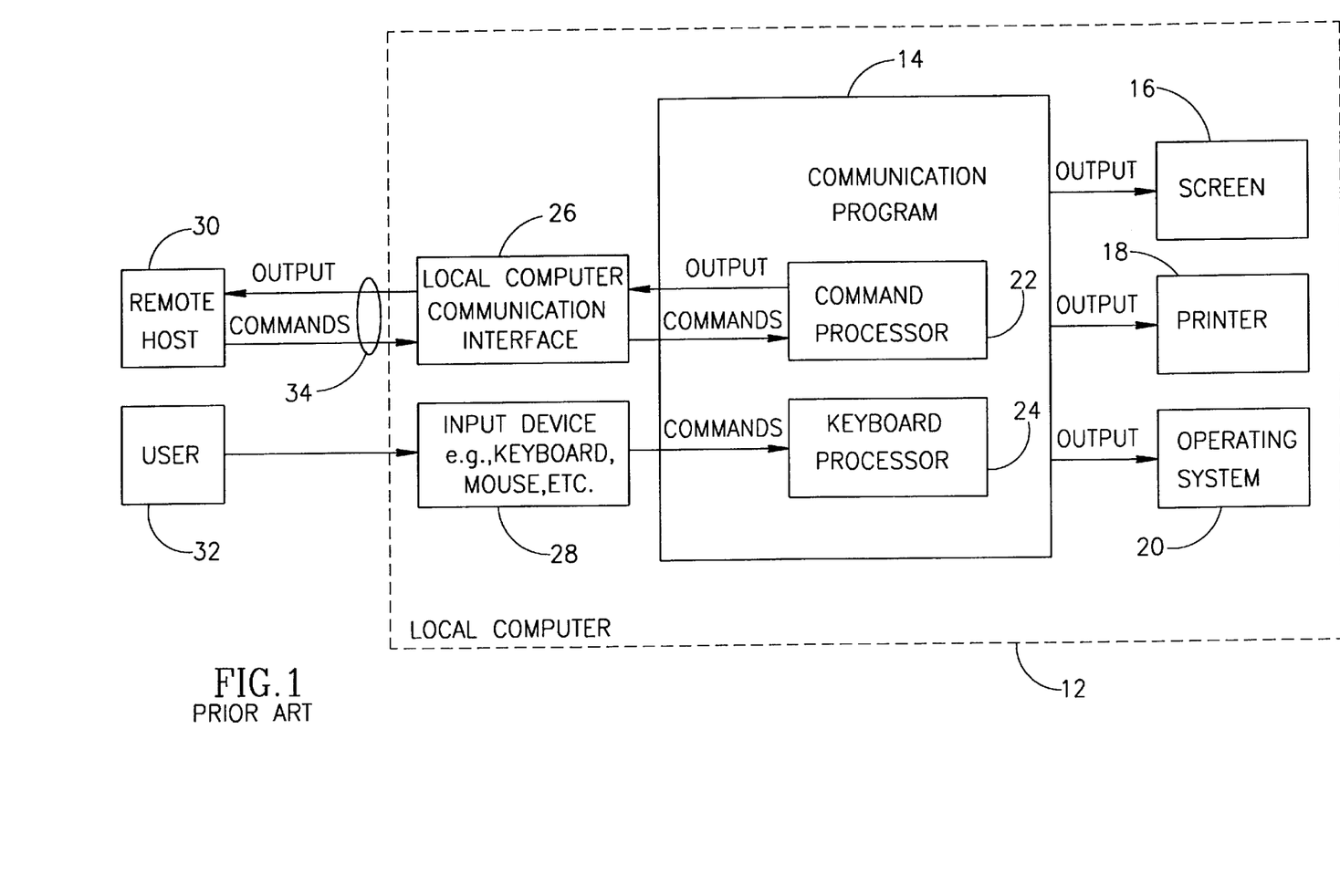
FIG. 1 is a high level block diagram illustrating the relevant components of a prior art local computer system communicating with a remote host.

A high level block diagram illustrating the relevant components of a prior art local computer system 12 communicating with a remote host 30 is shown in FIG. 1. Local computer 12 comprises a communications program 14, local computer communications interface 26, input device 28 (e.g., keyboard, mouse, etc.), screen 16, printer 18 and operating system 2. The communication program 14 comprises a conventional command processor 22 and a keyboard processor 24. The remote host 30 sends commands to the communication program 14 via the local computer communications interface 26 and communications link 34 (represented by the ellipse in the Figure) and are interpreted by the command processor 22. The command processor outputs data to the remote host through the same path but in reverse. A user 32 issues commands and types characters to be input to the communication program via input device 28. The input data is interpreted by keyboard processor 24.

The command processor 22 has the capability to identify communication program commands and their associated parameters. The command processor also has the capability to respond in accordance thereto. Typically, characters comprising commands are not displayed on the screen. For example, when a command processor for a VT100, a popular terminal device, receives as input the string '<ESC >[3;5H', this string will be recognized as a cursor positioning command and not as input data. The '3' is recognized as a line parameter and the '5' is recognized as the column parameter. As a result, the command processor will initiate a procedure that causes the cursor to move to line 3, column 5.

A major disadvantage of conventional command processors is that their repertoire of commands and associated responses are fixed and hard coded within the communication program. They do not allow any flexibility in modifying the command set or any of the responses to a command. In many cases it would be very beneficial if it were possible to modify a command processor's set of commands and their responses.

SUMMARY OF THE INVENTION

Accordingly, it is an object of the present invention to provide a communication system wherein the command processor's set of commands and associated responses are not fixed.

It is another object of the present invention to provide a communication system which incorporates a flexible command processor and is able to define commands at runtime.

Another object of the present invention is to provide a communication system which incorporates a flexible command processor and is able to define responses at runtime.

A dynamic pattern matching system (DPRS) for a communication system is disclosed. The DPRS enables the command processor within the communication system to be flexible, permitting commands and their associated responses to be added, deleted and changed on the fly while the communication system is operative. A user designs a command set and constructs a trap definition file. This trap definition file is read by the DPRS during initialization and a trap chain is constructed. The trap chain is a list of all the traps constituting the command set. Traps, however, can be added and deleted on the fly via commands from the remote host or entered by a user via the keyboard or menus. The DPRS can be used as a tool to dynamically alter the behavior of an existing host application communication system. The DPRS can function as a stand alone flexible command processor or can work in parallel or serial fashion with a conventional command processor.

BRIEF DESCRIPTION OF THE DRAWINGS

The invention is herein described, by way of example only, with reference to the accompanying drawings, wherein.

DETAILED DESCRIPTION OF THE INVENTION

The present invention overcomes the disadvantages of the prior art by utilizing a dynamic pattern recognition system (DPRS) to handle input from the remote host. The DPRS also outputs to similar targets such as the communication line, screen, printer and the operating system. A major component of the DPRS is a flexible command processor. The command processor serves to process input received over a communication link. In addition, it functions to define the commands that are recognized at runtime. The command processor also defines the responses to these commands at runtime as well. A command definition and its associated response is termed a trap. The flexible command processor the present invention utilizes the collection of these traps to define its functionality.

Figure 2:
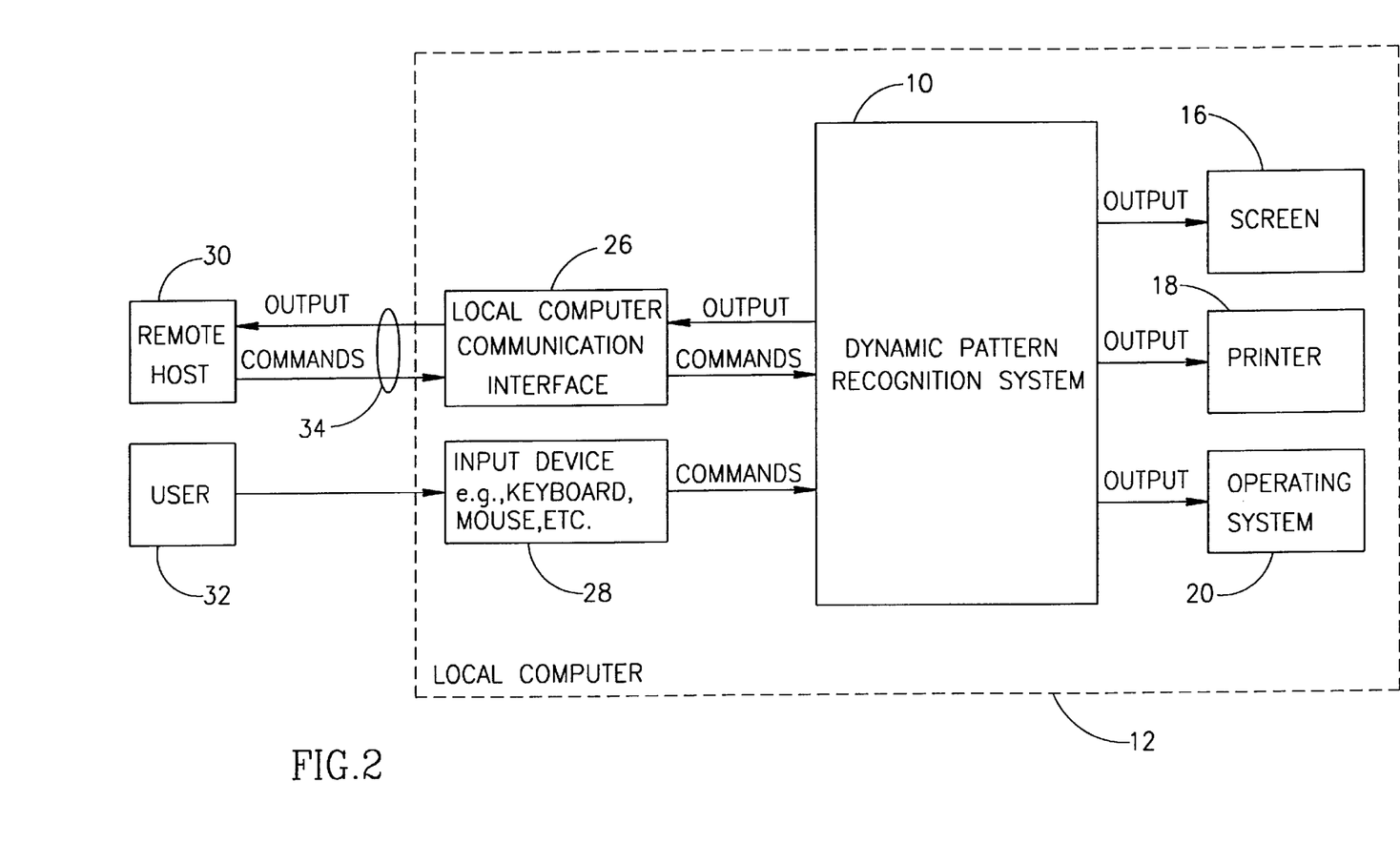
FIG. 2 is a high level block diagram illustrating a local computer incorporating a dynamic pattern recognition system constructed in accordance with a preferred embodiment of the present invention.

A high level block diagram illustrating a local computer incorporating a dynamic pattern recognition system constructed in accordance with a preferred embodiment of the present invention is shown in FIG. 2. The local computer 12 comprises a dynamic pattern recognition system (DPRS) 10. The DPRS 10 is coupled to a local computer communication interface 26, input device 28 (e.g., keyboard, mouse, etc.), screen (i.e., display terminal) 16, printer 18 and operating system 20. A remote host 30 sends commands and data to the DPRS via communication line 34 and local computer communication interface 26. Output from the DPRS is sent to the remote host via the local computer communication interface and the communication line 34. A user 32 sends input commands and input data to the DPRS via input device 28.

During normal operation of the communication system of the present invention, the DPRS loads a set of traps as part of its initialization process. The flexible command processor within the DPRS has the ability to identify the set of commands and their parameters and respond in accordance thereto. At any time, the DPRS may load new traps to expand the current command processor. In addition, the DPRS, at any time, may delete traps to reduce the functionality of the command processor or change existing set of traps in order to modify the functionality of the command processor. In addition to user defined traps, the set of traps may include fixed or predefined traps.

Alternatively, the DPRS can be initialized without loading a set of traps. In this case, the DPRS lays idle until one or more traps are loaded at a later time. The traps can be loaded via a trap file, the operating system or by the user.

The process of adding, deleting and changing traps takes place as a result of interpreting a command received from either of three sources. The first source is the host that the DPRS is communicating with. The second source is from explicit commands issued by the user as a result of a menu selection, a button press, shortcut key, etc. Note that a received command can only be interpreted if it is a currently defined command. The third source is the operating system in the form of an application programming interface (API) call, interprocess communication such as dynamic data interchange (DDE), object linking and embedding (OLE), Window message, etc.

Thus, the DPRS is a tool that gives the end user the ability to alter the behavior of an existing host application by interpreting the output thereof. By using the DPRS, a user with special requirements can modify the behavior of an existing host application to conform to those special requirements. It is important to note that the DPRS can function as a stand alone 'flexible command processor' or can work in parallel or serial fashion with a conventional command processor which lacks the abilities of the DPRS. In the parallel case, both the DPRS and the conventional fixed command processor receive and process each input character or byte. In the serial case where the DPRS is located downstream from the command processor, the DPRS receives unrecognized data not processed by the command processor. In the serial case where the command processor is located downstream from the DPRS, the command processor receives unrecognized data not processed by the DPRS.

Figure 3:
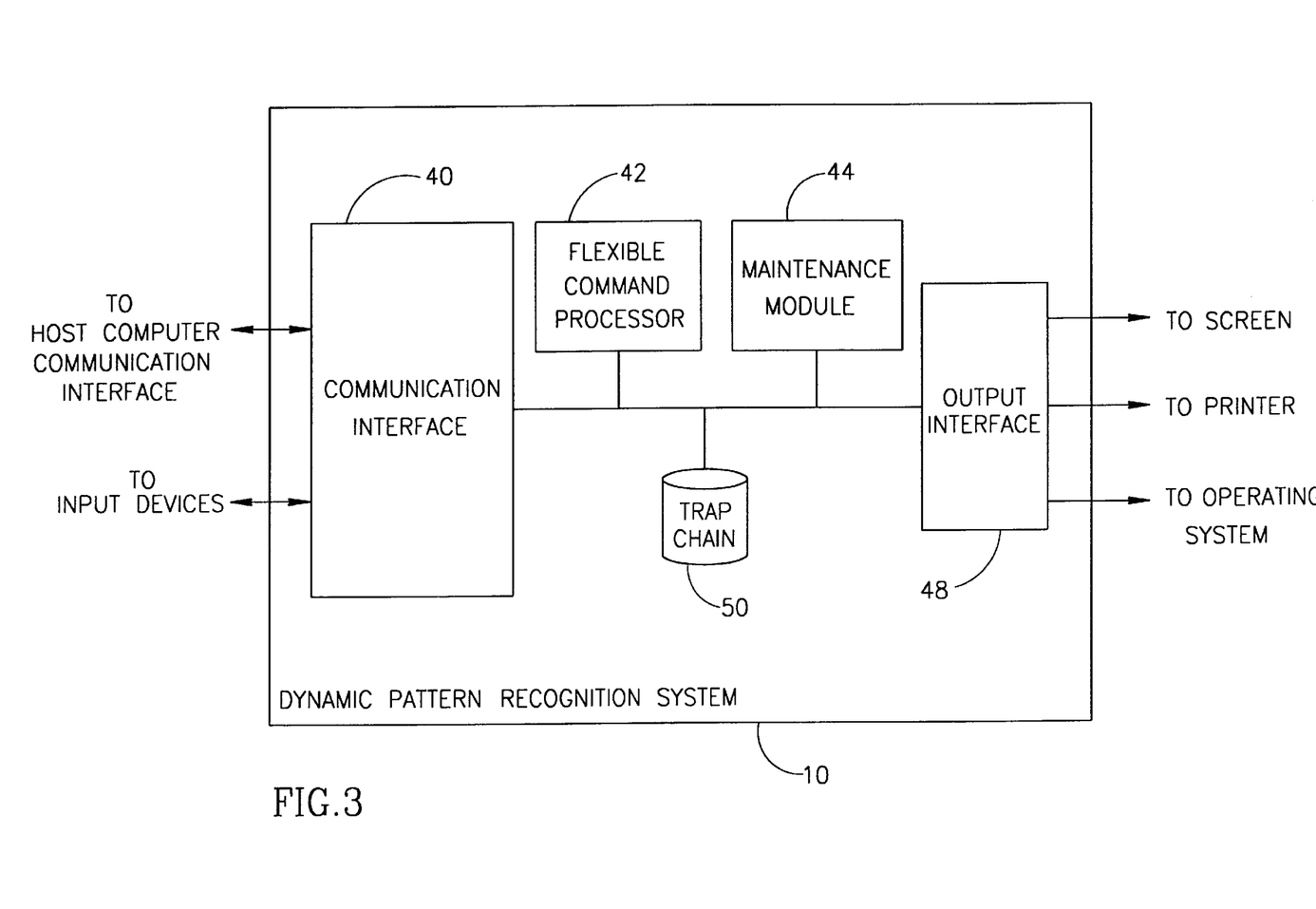
FIG. 3 is a high level block diagram illustrating the dynamic pattern recognition system of FIG. 2 in more detail.

A high level block diagram illustrating the dynamic pattern recognition system of FIG. 2 in more detail is shown in FIG. 3. The DPRS 10 comprises a communication interface 40, flexible command processor 42, maintenance module 44, output interface module 48 and a trap chain 50. The communication interface provides the interface between the DPRS and the local computer communication interface 26 (FIG. 2) and the input device 28. The DPRS also communicates with the screen 16 (FIG. 2), the printer 18 and the operating system 20.

The flexible command processor receives, interprets and responds to commands received from the remote host through the communication interface 40 and from the keyboard which were input by the user. Note, however, that most of the processing performed by the command processor is to process data received over the communication link. The majority of the data received via the keyboard from the user is transmitted to the remote host.

The maintenance module 44 functions to perform the addition, deletion and modification of traps. The trap chain can be modified by commands that are received by the DPRS and then executed by the maintenance module 44. In addition, new services can be added to the maintenance module to perform functions other than add, delete or change traps.

The output interface module 48 directs output to the proper target which may be for example, the screen, the printer, the operating system (e.g., operating system calls) and the communication line via the communication interface 40. The trap chain 50 contains the set of traps that currently define the functionally of the command processor.

Figure 4:
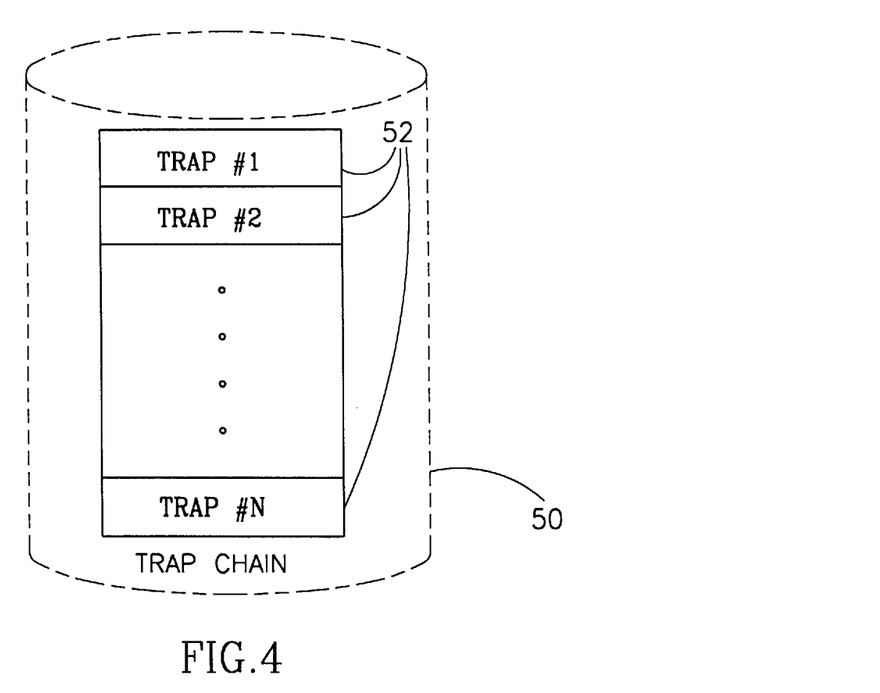
FIG. 4 is a high level block diagram illustrating the trap chain portion of the dynamic pattern recognition system.

A high level block diagram illustrating the trap chain portion of the dynamic pattern recognition system is shown in FIG. 4. The trap chain 50 comprises a list of individual traps. The chain may be any suitable type of list such as but not limited to a singly linked list, doubly linked list, etc. The trap chain can also be constructed as an array of traps, an array of pointers to traps or as any other suitable data structure. Shown in FIG. 4 is an example trap chain comprising a plurality of traps 52 labeled TRAP #1, TRAP #2 . . . TRAP #N.

Figure 5:
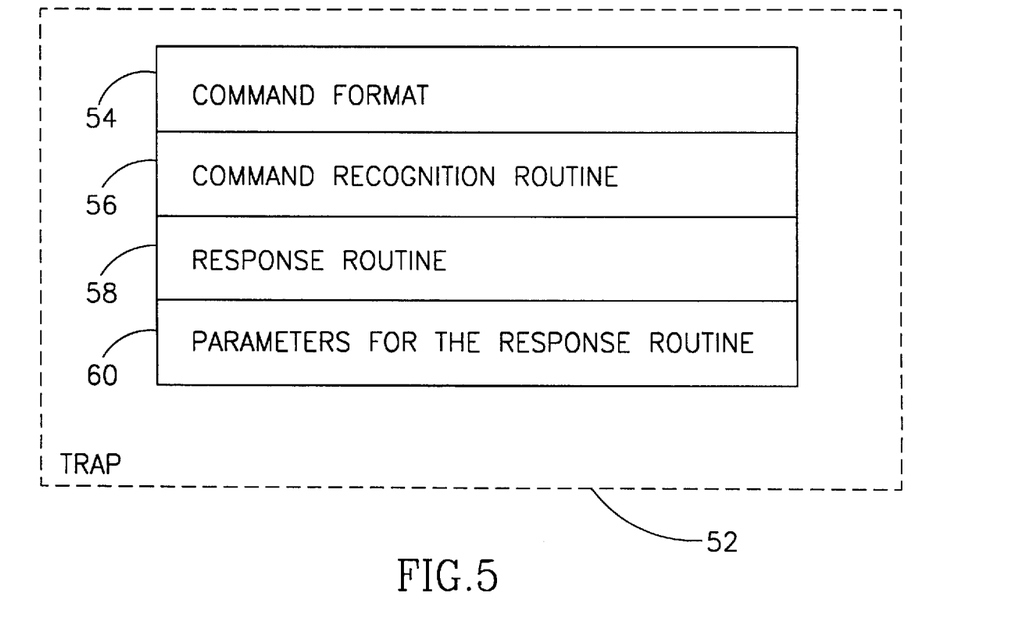
FIG. 5 illustrates in more detail the elements of one of the traps comprising the trap chain of FIG. 4.

FIG. 5 illustrates in more detail the elements of one of the traps 52 comprising the trap chain 50. As stated previously, the trap chain is a structure of individual traps (e.g., a linked list or array). Every trap 52, in turn, comprises four elements or components. The first element is a command format description 54 which describes the command. The command format description is utilized by a matching routine to determine which of the commands was received. The second element is a command recognition routine 56 which is a pointer to a match routine that is sued to recognize that particular command. When data is received, each trap's matching routine (i.e., command recognition routine) is called in an attempt to match the received data with one of the trap commands. As an alternative, a code can be utilized in place of a pointer. The third element is a response routine 58. This element is actually a pointer to the routine that is called if the match routine 56 finds a match between the received command and the command format description 54. This parameter can also be implemented as a code rather than a pointer. The forth element is the zero or more parameters for the response routine 60. These parameters are utilized by the response routine when it is executed (i.e., a match is found). Note that some response routines may not require any parameters.

The trap chain is constructed from a plurality of traps. The traps are initially loaded from a file called a trap file. The trap file comprises a plurality of records, with each record comprising: a command definition corresponding to the command format description 54 which is a string of characters defining the pattern of the command; a command recognition routine code which is a code used to identify the match routine for this particular trap; a response routine code which is a code used to identify the response routine for this particular trap; and a set of parameters for the response routine. In a preferred embodiment of the present invention, characters and strings are used to represent the four trap elements described above within each record of the trap file. In an alternative embodiment, the elements can be represented in the trap file in binary form or a combination of binary and text data.

Note that the order of the fields in a trap record is not important. The fields may be implemented in any desired order. In addition, the trap implementation can omit the parameter field or can add additional fields to suit any purpose of the actual implementation. The command pattern field of a trap may be implemented, for example, as a string, an array, a record of any type, memory allocation or as a variant type record. The recognition and response fields may be implemented in any suitable way including but not limited to pointers to procedures, procedure code numbers, etc. The parameter field of a trap can be implemented as a string, array or a record of any type, including a variant type record or a memory allocation, each of which may be referenced directly or indirectly.

At a minimum, the command format 54 (FIG. 5) and the parameters for the response must be included in each trap. The match routine and the response may be fixed. The parameters for the response may include, for example, the name of a file to be run when the command pattern is matched.

Figure 6:
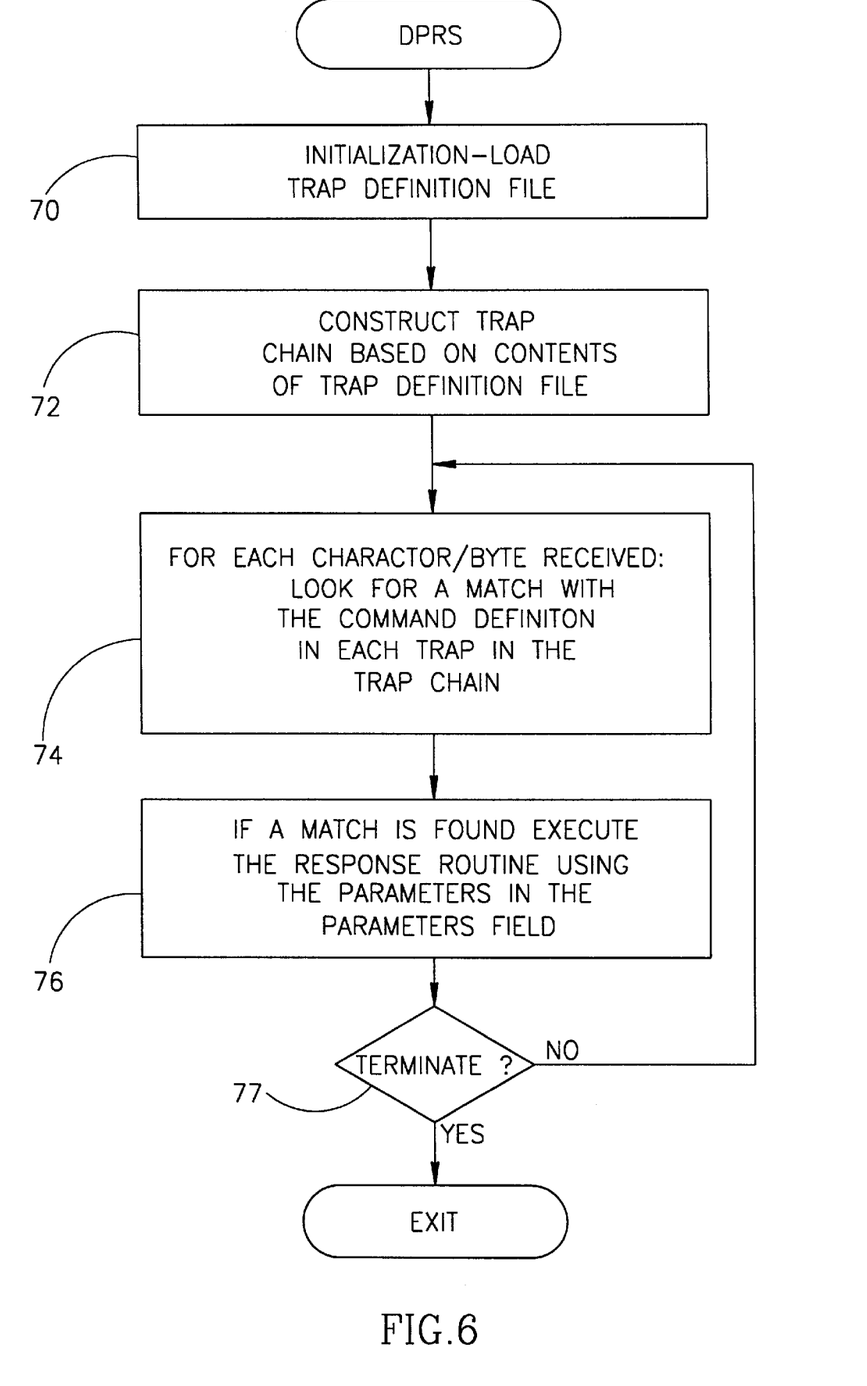
FIG. 6 is a high level flow diagram illustrating the process executed by the dynamic pattern recognition system of the present invention.

A high level flow diagram illustrating the process executed by the dynamic pattern recognition system of the present invention is shown in FIG. 6. Before the DPRS can be used to interpret commands, a user must first design and construct a set of traps (i.e., build a command set) that perform the desired functions. The set of traps built by the user are than placed in a trap definition file which is then used when the DPRS is initialized.

During its initialization process, the DPRS loads the trap definitions from the trap definition file (step 70). Note that the DPRS can load trap definitions directly from a file or via any other suitable way, for example, via a script file containing command for loading traps. In addition, traps can be loaded by the remote host through the communication line, by the user through menus or input dialog boxes or via the operating system. The DPRS then uses the trap definitions in the trap definition file to construct the trap chain (step 72). The ADD trap service is utilized to add each record to the trap chain. During operation of the DPRS, each character or byte sent from the remote host is received by the DPRS via the communication interface 40 (FIG. 3). The DPRS scans the trap chain one by one in search of a command that matched the received characters. Control is passed to the command recognition routine 56 (FIG. 5) within each individual trap in order to attempt a match between the input character/byte and the command definition 54 (step 74). If the input characters/bytes matches a particular trap's 'command,' the response routine for that particular trap is called to carry out the command's function using the parameters stored in the parameters field 60 of the trap (step 76). The process of searching for a match and executing the corresponding response routine is repeated over and over again until the DPRS process is terminated (step 77).

The commands or services for adding, deleting and modifying traps are part of the maintenance module 44 (FIG. 3) command repertoire. This allows the user to define commands to change the traps during operation of the DPRS. The ADD trap service functions to add new traps to the trap chain. Memory is allocated for the trap record, its fields filled in with the trap data and the new record added to the trap chain.

The DELETE trap service functions to delete an existing trap. Using a trap record as a parameter, it scans the list for a match with an identical record. If a match is found, the record if taken out of the list and the memory utilized by the record is returned to the operating system.

The CHANGE trap service functions to change a particular trap. The input parameters define a new trap record is to replace an existing one.

In addition, a service called CLEAR ALL can be defined to clear out all existing traps. If the list is not empty, the CLEAR ALL service removes all the records from the list and returns the memory occupied by the entire list to the operating system.

At a minimum, the maintenance module within the DPRS must have the ADD trap service so as to be able to add or create new traps. In a preferred embodiment, however, the maintenance module also comprises DELETE, CHANGE and CLEAR ALL traps services. In an alternative embodiment, additional services may be added to the maintenance module.

Figure 7A:
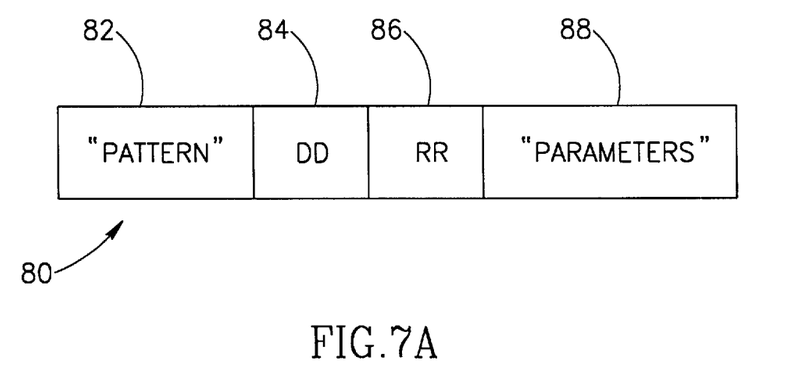
FIG. 7A illustrates the format of each record in the trap definition file.
Figure 7B:
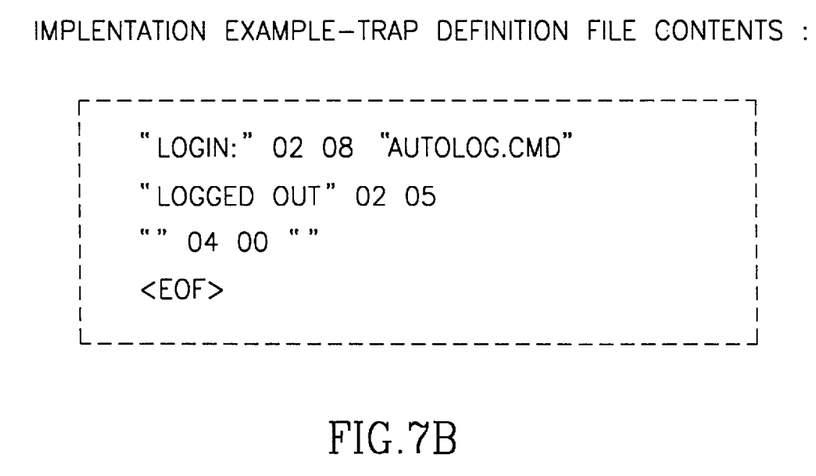
FIG. 7B is an implementation example of the contents of a trap definition file.

An implementation example of the contents of a trap definition file is illustrated in FIG. 7B. The following basic example is meant to serve as an aid to understanding the principle of operation of the present invention. It is presented for illustration purposes only and does not in any way limit the scope or application of the present invention. The trap definition file can have any suitable format or structure. The only requirement is that it be of sufficient size to hold all the trap records and their fields.

In this example, the following are the options to be made available for the match routine:

1. string match—case sensitive
2. string match—non case sensitive
3. regular expression match
4. VT100 command processor Likewise, the optional response routines are the following:

1. clear the screen
2. write a message
3. pop up a menu
4. pop up a message box
5. exit the program
6. send a Window's message
7. run a Windows or DOS program
8. execute a script An illustration of the format of each record 80 in the trap definition file is shown in FIG. 7A. The four fields of the record correspond to the four elements of the trap illustrated in FIG. 5. The first field 82 is the pattern field which corresponds to the command format 54 of FIG. 5. The second field is the DD field 84 which comprises two digits corresponding to the command recognition routine 56 (i.e., match routine). The third field is the RR field 86 which is a two digit code for the response routine 58. The forth field is the parameter field 88 corresponding to the parameters field 60.

The trap definition field is ASCII based in this example and its contents is presented in FIG. 7B. As stated previously, the trap chain is preferably implemented as a linked list of traps. Each trap record has a pattern string, recognition procedure code, response routine code and parameter string.

Each line in the trap definition file will now be explained in more detail. The first field is the command definition, followed by the match routine code, the response routine code and the parameters. The first definition or line is a record defining the command 'Login:', which is to be non case sensitive for match purposes, as indicated by the '02'. The '08' signifies that the response is to execute a script with the name of the script being 'Autolog.cmd'.

the second definition defines the command 'Logged out', which is also to be non case sensitive for match purposes, as indicated by the '02'. The '05' indicates that when 'Logged out' is detected, the program is to terminate and return to the operating system.

The third definition implements every command in the standard VT100 command processor. The '"' indicates a null command definition, the '04' signifies the VT100 command set, the '00' represents no response routine and the '"' signifies no parameters. In this definition there is no command, response or parameters because the VT100 command processor already encapsulates several command definitions and their associated responses.

Alternatively, the present invention can be constructed utilizing the techniques of object oriented programming (OOP) methods. In OOP implementation, every trap would comprise its own distinct object type. The object would comprise a:
  pattern
  parameters for the response routine/response code
In addition, each object would include the following routines:
  Create—initialize the object and place it within the trap chain
  Check—receive input data and check it for a match against the pattern
  Response—perform the response routine in the event a match is found
    Delete—remove the object from the trap chain and delete it
The OOP implementation itself can have numerous variations. They all, however, follow the same principle which include:
  1. a chain of objects (i.e., traps)
  2. a well defined match algorithm or routine for every trap
  3. a well defined response routine for every trap
  4. a pattern or command definition
  5. zero or more parameters for the response routine While the invention has been described with respect to a limited number of embodiments, it will be appreciated that many variations, modifications and other applications of the invention may be made.

What is claimed is:

1. A dynamic pattern matching system (DPRS) for use in a communication system coupled to a communication link, comprising:

a communication interface coupled to said communication link, said communication interface coupling said DPRS to said communication link;

processing means coupled to said communication interface, said processing means for processing input data received over said communication link; and a trap chain consisting of a plurality of traps, said plurality of traps corresponding to a set of commands which define the functionality of said DPRS, each trap corresponding to a unique command.

2. The system according to claim 1, further comprising means for adding additional traps to said trap chain in accordance with commands received over said communication link.

3. The system according to claim 1, further comprising output interface means coupled to at least one output device, said output interface means for outputting character and/or byte data from said DPRS to said at least one output device.

4. The system according to claim 1, wherein said processing means processes input data received from a user.

5. The system according to claim 1, wherein said processing means processes input data received from an operating system.

6. The system according to claim 1, wherein additional traps are added to said trap chain in accordance with commands received via the user.

7. The system according to claim 1, further comprising means for deleting traps from said trap chain in accordance with commands received over said communication link.

8. The system according to claim 1, wherein said trap chain comprises a linked list of traps.

9. The system according to claim 1, wherein said trap chain comprises an array of traps.

10. The system according to claim 1, wherein each trap within said trap chain comprises a command definition field, a command matching routine field, a response routine field and a parameter field.

11. The system according to claim 1, wherein each trap within said trap chain comprises an object.

12. The system according to claim 11, wherein each object comprises a pattern definition, a match routine, a response routine and zero or more parameters for said response routine.

13. A method of dynamically matching patterns in a communication system coupled to a communication link, said communication system incorporating a plurality of trap definitions, said method comprising the steps of:

constructing a trap chain from the contents of said plurality of trap definitions;

searching for a trap match between characters received over said communication link and each of said trap definitions; and executing, for each trap match found, a response routine associated with said matched trap.

14. The method according to claim 13, further comprising the step of loading said plurality of trap definitions.

15. The method according to claim 13, wherein said step of constructing a trap chain comprises the step of constructing a list of individual traps.

16. The method according to claim 13, wherein said step of constructing a trap chain comprises the step of constructing an array of individual traps.

17. The system according to claim 13, wherein each trap within said trap chain comprises a command definition field, a command matching routine field, a response routine field and a parameter field.

18. The system according to claim 13, wherein each trap within said trap chain comprises an object.

19. The system according to claim 18, wherein each object comprises a pattern definition, a match routine, a response routine and zero or more parameters for said response routine.

* * * * *